US010233841B2

United States Patent
Bintz et al.

(10) Patent No.: US 10,233,841 B2
(45) Date of Patent: Mar. 19, 2019

(54) THERMAL MANAGEMENT SYSTEM FOR A GAS TURBINE ENGINE WITH AN INTEGRAL OIL TANK AND HEAT EXCHANGER IN THE NACELLE

(71) Applicant: United Technologies Corporation, Hartford, CT (US)

(72) Inventors: Matthew E. Bintz, West Hartford, CT (US); Charles P. Gendrich, Middletown, CT (US); John C. DiTomasso, Glastonbury, CT (US); Andrew J. Murphy, Old Saybrook, CT (US)

(73) Assignee: United Technologies Corporation, Farmington, CT (US)

( * ) Notice: Subject to any disclaimer, the term of this patent is extended or adjusted under 35 U.S.C. 154(b) by 515 days.

(21) Appl. No.: 14/933,518

(22) Filed: Nov. 5, 2015

(65) Prior Publication Data

US 2016/0131036 A1    May 12, 2016

Related U.S. Application Data

(60) Provisional application No. 62/076,161, filed on Nov. 6, 2014.

(51) Int. Cl.
*F02C 7/14* (2006.01)
*F02C 7/16* (2006.01)
(Continued)

(52) U.S. Cl.
CPC .............. *F02C 7/16* (2013.01); *F01D 25/162* (2013.01); *F02C 7/047* (2013.01); *F02C 7/14* (2013.01);
(Continued)

(58) Field of Classification Search
CPC ...... F02C 7/12; F02C 7/14; F02C 7/16; F02C 7/047; F02K 3/06; F02K 9/40;
(Continued)

(56) References Cited

U.S. PATENT DOCUMENTS 4,782,658 A * 11/1988 Perry ...................... F02C 7/047
60/226.1
4,914,904 A *  4/1990 Parnes .................... F01D 9/065
165/168

(Continued)

FOREIGN PATENT DOCUMENTS

CA         2597658       2/2008
EP         1630358       3/2006
(Continued)

OTHER PUBLICATIONS

Extended European Search Report for Application No. 15193026.0 dated Apr. 8, 2016.

*Primary Examiner* — William H Rodriguez
*Assistant Examiner* — James McGlynn
(74) *Attorney, Agent, or Firm* — Carlson, Gaskey & Olds, P.C.

(57) ABSTRACT

In one exemplary embodiment, a gas turbine engine system for cooling engine components includes an engine core, a core housing containing the engine core, an engine core driven fan forward of the core housing, a nacelle surrounding the fan and the core housing, and a bypass duct defined between an outer diameter of the core housing and an inner diameter of the nacelle. Also included is a thermal management system having a coolant circuit including at least one of a first heat exchanger disposed on the inner diameter of the nacelle and a second heat exchanger disposed on a
(Continued)

leading edge of a BiFi spanning the bypass duct. The first heat exchanger is in thermal communication with the second heat exchanger.

12 Claims, 4 Drawing Sheets

(51) Int. Cl.
| | |
|---|---|
| *F01D 25/16* | (2006.01) |
| *F02K 3/06* | (2006.01) |
| *F02C 7/047* | (2006.01) |
| *B64D 15/06* | (2006.01) |
| *F02C 7/12* | (2006.01) |
| *B64D 15/02* | (2006.01) |
| *B64D 15/00* | (2006.01) |
| *F01D 25/02* | (2006.01) |

(52) U.S. Cl.
CPC ............ *F02K 3/06* (2013.01); *B64D 15/00* (2013.01); *B64D 15/02* (2013.01); *B64D 15/06* (2013.01); *F01D 25/02* (2013.01); *F02C 7/12* (2013.01); *F05D 2220/32* (2013.01); *F05D 2260/213* (2013.01); *F05D 2260/98* (2013.01); *Y02T 50/675* (2013.01)

(58) Field of Classification Search
CPC ............ F01D 25/02; F05D 2260/213; F05D 2260/98; B64D 15/00; B64D 15/02; B64D 15/06
See application file for complete search history.

(56) References Cited

U.S. PATENT DOCUMENTS

| | | | |
|---|---|---|---|
| 5,423,174 A | 6/1995 | Mouton | |
| 5,729,969 A | 3/1998 | Porte | |
| 7,131,612 B2 | 11/2006 | Baptist et al. | |
| 7,900,438 B2 * | 3/2011 | Venkataramani | F01D 9/065 |
| | | | 244/134 B |
| 8,052,089 B2 | 11/2011 | Etling | |
| 8,499,822 B2 * | 8/2013 | Bulin | F02C 7/14 |
| | | | 165/41 |
| 8,702,039 B1 | 4/2014 | Epstein | |
| 8,769,924 B2 | 7/2014 | Cloft | |
| 8,915,058 B2 | 12/2014 | Knott et al. | |
| 8,967,543 B2 * | 3/2015 | Saito | F01D 25/02 |
| | | | 239/599 |
| 9,194,294 B2 * | 11/2015 | Suciu | F02C 7/06 |
| 9,429,072 B2 * | 8/2016 | Diaz | F02C 7/047 |
| 2005/0150204 A1 | 7/2005 | Stretton et al. | |
| 2006/0032983 A1 | 2/2006 | Brand et al. | |
| 2009/0165995 A1 | 7/2009 | Bajusz et al. | |
| 2009/0188234 A1 * | 7/2009 | Suciu | F02C 7/14 |
| | | | 60/262 |
| 2012/0168115 A1 | 7/2012 | Raimarckers et al. | |
| 2013/0219854 A1 * | 8/2013 | Alecu | F02K 3/115 |
| | | | 60/204 |
| 2014/0205446 A1 * | 7/2014 | Patsouris | F02C 7/047 |
| | | | 415/175 |
| 2015/0377130 A1 * | 12/2015 | Xu | F02K 3/06 |
| | | | 60/779 |
| 2015/0377132 A1 * | 12/2015 | Caruel | F01D 25/12 |
| | | | 415/116 |
| 2016/0114898 A1 * | 4/2016 | Llamas Castro | B64D 33/02 |
| | | | 415/177 |
| 2016/0160758 A1 * | 6/2016 | Marchaj | F02C 7/047 |
| | | | 60/779 |
| 2018/0038243 A1 * | 2/2018 | Rambo | F01D 17/105 |

FOREIGN PATENT DOCUMENTS

| | | |
|---|---|---|
| EP | 2009260 | 12/2008 |
| FR | 2987602 | 9/2013 |
| GB | 2413366 | 10/2005 |

* cited by examiner

THERMAL MANAGEMENT SYSTEM FOR A GAS TURBINE ENGINE WITH AN INTEGRAL OIL TANK AND HEAT EXCHANGER IN THE NACELLE

CROSS-REFERENCE TO RELATED APPLICATION

This application claims priority to U.S. Provisional Application No. 62/076,161 filed Nov. 6, 2014.

TECHNICAL FIELD

The present disclosure relates generally to liquid cooled thermal management systems for a gas turbine engine, and more specifically to an integrated fan liquid cooled thermal management system.

BACKGROUND

Gas turbine engines, such as those utilized on commercial aircraft, include a compressor operable to compress air, a combustor that mixes the compressed air with a fuel and ignites the mixture, and a turbine section that is driven to rotate by expansion of the resultant combustion gasses. The compressor, combustor and turbine are contained within an engine core. In some engines a fan is mounted at the front of the engine core. The rotation of the fan is driven by the turbine. In some gas turbine engines, referred to as turbofan engines, the fan drives air into the compressor and into a fan duct surrounding the engine core.

In order to properly heat and cool the various engine systems and components within the cowl and the engine core, a liquid coolant is pumped through the engine, and through multiple heat exchangers in a thermal management system. Existing thermal management systems typically dispose at least a portion of the heat exchangers in the fan duct in a manner that creates drag on the air passing through the fan duct. The creation of drag on the air passing through the fan duct decreases the efficiency of the engine.

SUMMARY OF THE INVENTION

In one exemplary embodiment, a gas turbine engine system for cooling engine components includes an engine core, a core housing containing the engine core, an engine core driven fan forward of the core housing, a nacelle surrounding the fan and the core housing, and a bypass duct defined between an outer diameter of the core housing and an inner diameter of the nacelle. A thermal management system includes a coolant circuit including at least one of a first heat exchanger disposed on the inner diameter of the nacelle and a second heat exchanger disposed on a leading edge of a BiFi spanning the bypass duct. The first heat exchanger is in thermal communication with the second heat exchanger.

In another exemplary embodiment of the above described gas turbine engine, the coolant circuit includes both the first heat exchanger and the second heat exchanger.

In another exemplary embodiment of any of the above described gas turbine engines, a first coolant loop within the coolant circuit comprises the first heat exchanger, the second heat exchanger, and the cooled engine systems. A second coolant loop in the coolant circuit includes a nacelle anti-icer.

In another exemplary embodiment of any of the above described gas turbine engines, the coolant circuit further includes a fluid containment component including a heat exchanger operable to exchange heat from a first coolant to a second coolant, and having a first coolant input, a first coolant output, a second coolant input and a second coolant output.

In another exemplary embodiment of any of the above described gas turbine engines, a first coolant loop within the coolant circuit comprises the first heat exchanger, the second heat exchanger, and a subset of the plurality of cooled engine systems. A second coolant loop within the coolant circuit comprises a second subset of the plurality of cooled engine systems. The first coolant loop is fluidly connected to the first coolant input and the first coolant output of the fluid containment component. The second coolant loop is fluidly connected to the second coolant input and the second coolant output of the fluid containment component.

In another exemplary embodiment of any of the above described gas turbine engines, a coolant in the first cooling loop is a water anti-freeze mixture, and a coolant in the second cooling loop is an oil based coolant.

In another exemplary embodiment of any of the above described gas turbine engines, a first coolant loop within the coolant circuit comprises the first heat exchanger, and a third heat exchanger disposed at a nacelle leading edge, such that the third heat exchanger is operable to be a nacelle anti-icer. A second coolant loop within the coolant circuit includes the second heat exchanger and the cooled engine systems. The first coolant loop is fluidly connected to the first coolant input and the first coolant output of the fluid containment component. The second coolant loop is fluidly connected to the second coolant input and the second coolant output of the fluid containment component.

In another exemplary embodiment of any of the above described gas turbine engines, the coolant circuit further includes a third heat exchanger disposed at a nacelle leading edge such that the third heat exchanger is operable to be a nacelle anti-icer.

In another exemplary embodiment of any of the above described gas turbine engines, the coolant circuit further includes a bypass valve fluidly connecting the third heat exchanger to the first heat exchanger such that fluid flowing through the cooling circuit can selectively bypass the third heat exchanger.

In another exemplary embodiment of any of the above described gas turbine engines, the coolant circuit includes at least one pump operable to drive cooling fluid flow through the coolant circuit.

An exemplary method for cooling a gas turbine engine includes passing a first liquid coolant through a first liquid cooling loop including a first heat exchanger and a second heat exchanger, thereby at least partially cooling the first liquid coolant. The first heat exchanger and the second heat exchanger are disposed within an engine nacelle and passes a second liquid coolant through a second liquid cooling loop including a third heat exchanger and at least one engine component, thereby at least partially cooling the second liquid coolant and cooling at least one engine component. The third heat exchanger spans a bypass duct and the at least one engine component is disposed within a gas turbine engine core.

A further example of the above exemplary method includes providing an output of the first liquid cooling loop to an input of the second liquid cooling loop, thereby forms a unified cooling loop.

In a further example of any of the above exemplary methods, an output of the first liquid cooling loop is provided to a fluid containment component heat exchanger, and the fluid containment component heat exchanger cools the second liquid coolant relative to the first liquid coolant.

In a further example of any of the above exemplary methods, passing a first liquid coolant through a first liquid cooling loop including a first heat exchanger and a second heat exchanger further comprises operating the first heat exchanger as a nacelle anti-icer.

In a further example of any of the above exemplary methods, passing a first liquid coolant through a first liquid cooling loop comprise passing a water anti-freeze mixture through the first liquid cooling loop.

In a further example of any of the above exemplary methods, passing a second liquid coolant through a second liquid cooling loop comprises passing an oil based liquid coolant through the second liquid cooling loop.

In one exemplary embodiment, a gas turbine engine includes an engine core, a core housing containing the engine core, and a core driven fan forward of the core housing, a nacelle surrounding the core housing, and a bypass duct defined between an outer diameter of the core housing and an inner diameter of the nacelle. A thermal management system includes a fluid storage component, a first heat exchanger fluidly connected to an output of the fluid storage component, a second heat exchanger fluidly connected to the output of the fluid storage component and an output of the first heat exchanger. The second heat exchanger is disposed on, and flush with, an inner diameter surface of the nacelle. The third heat exchanger has a liquid coolant input. The liquid coolant input is connected to one of an output of the second heat exchanger and an output of the fluid storage component. An output of an engine core coolant system is fluidly connected to an input of the fluid storage component. A liquid coolant in the liquid cooled thermal management system is one of a water antifreeze mixture, an oil based coolant, and a combination water anti-freeze mixture and oil based coolant.

In another exemplary embodiment of the above described gas turbine engine the third heat exchanger is positioned at a leading edge of a BiFi spanning the bypass duct.

These and other features of the present invention can be best understood from the following specification and drawings, the following of which is a brief description.

DETAILED DESCRIPTION OF AN EMBODIMENT

Figure 1:
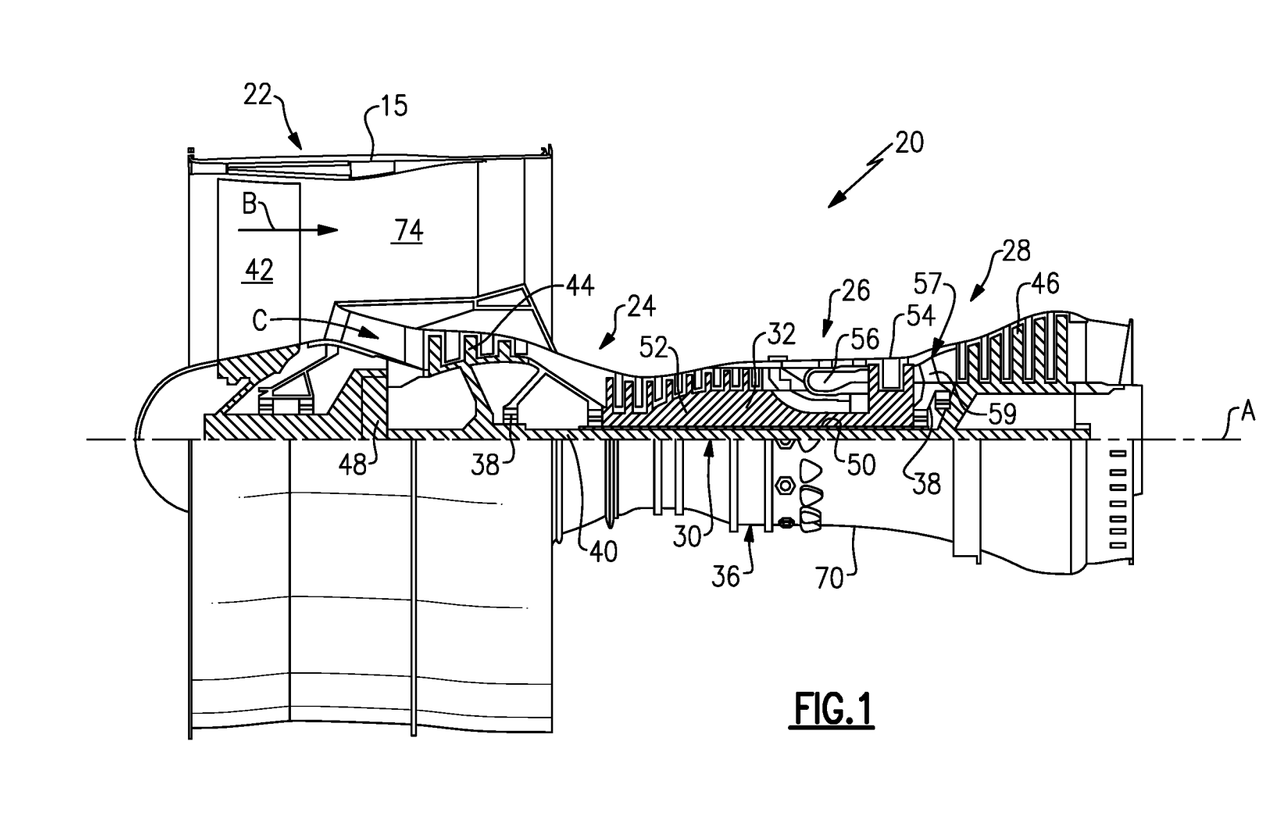
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct 74 defined at least partially within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,°\,R)/(518.7°\,R)]^{\wedge}0.5$. The "Low corrected fan tip speed" as disclosed herein according to one non-limiting embodiment is less than about 1150 ft/second.

The compressor section 24, combustor section 26 and turbine section 28, as well as their accompanying components are contained within an engine core 70. A bypass duct 74 is defined between the engine core 70 and the fan case 15.

In order to ensure that the various engine components within the engine core 70 are properly cooled, a liquid thermal management system (illustrated in FIGS. 2-4) is implemented within the gas turbine engine 20. The thermal management system distributes a liquid coolant to various portions of the engine 20 and provides desired heating and cooling to the various engine components within the engine core 70.

Figure 2:
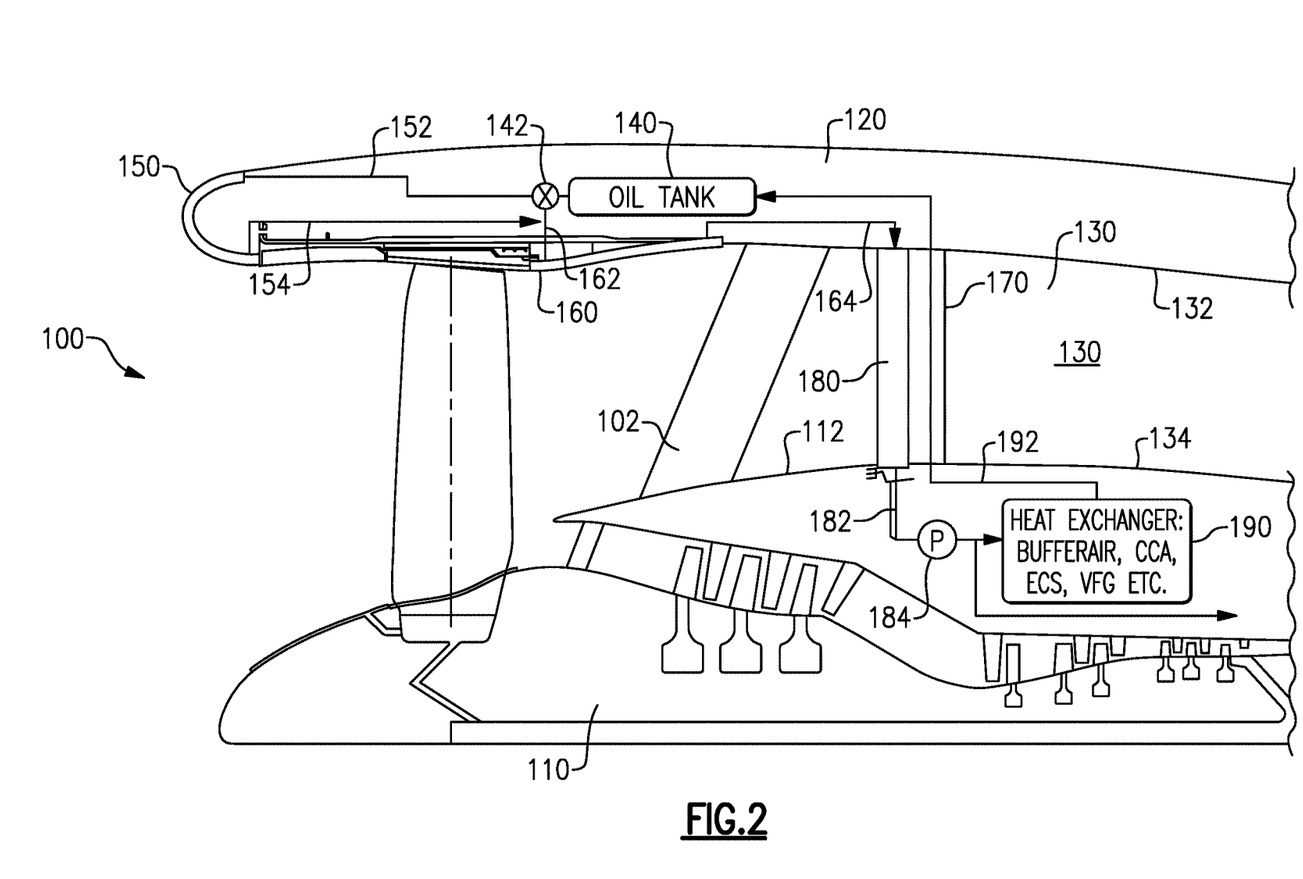
FIG. 2 schematically illustrates a first example thermal management system for a gas turbine engine.

FIG. 2 illustrates a first example thermal management system for a gas turbine engine 100, such as the gas turbine engine 20 of FIG. 1. The gas turbine engine 100 includes an engine core 110, disposed within a core housing 112. Encompassed within the core housing 112, and making up the engine core 110 are a compressor section, a combustor, a turbine section, as well as all accompanying engine components. A nacelle 120 radially surrounds the engine core 110, and a bypass duct 130 is defined between the nacelle 120 and the engine core 110, with an outer bypass duct outer diameter 132 being an inner diameter of the nacelle 120 and a bypass duct inner diameter 134 being an outer diameter of the core housing 112.

The nacelle 120 is supported relative to the engine core 110 via a support strut 102. The support strut 102 spans the bypass duct 130. In a practical example, multiple support struts 102 are disposed circumferentially about the bypass duct 130. Also disposed within the bypass duct 130, and spanning the bypass duct 130 is a bifurcation (BiFi) 170.

The thermal management system included within the illustrated gas turbine engine 100 includes a tank 140 disposed in the nacelle 120. The tank 140 is an oil tank that accumulates and stores heated liquid coolant, such as oil. A bypass valve 142 connects an output of the tank 140 to a first heat exchanger 150 via a first fluid line 152, and to a second heat exchanger 160 via a second fluid line 162. The first heat exchanger 150 is located at a leading edge of the nacelle 120, and operates to both cool a hot liquid passing through the first heat exchanger 150, and heat the leading edge of the nacelle 120. The heating effect allows the first heat exchanger 150 to operate as a nacelle anti-icer, in addition to cooling the liquid coolant passing through the thermal management system. The output of the first heat exchanger 150 is passed through a fluid line 154 and joined with the fluid line 162 connecting the valve 142 to the second heat exchanger 160 thereby allowing the first heat exchanger 150 to be bypassed.

The second heat exchanger 160 is positioned on a radially inward facing surface of the bypass duct outer diameter 132, is flush with a radially inward facing surface of the bypass duct 130. By positioning the second heat exchanger 160 on the bypass duct outer diameter 132, instead of the bypass duct inner diameter 134, the surface area of the second heat exchanger 160 relative to the axial length of the second heat exchanger 160 is significantly increased. This allows the second heat exchanger 160 to have a maximized heat exchanger surface area in an area of the fan duct 130 where air velocities in the fan duct 130 are maximum. Due to the position in the bypass duct 130, the second heat exchanger 160 exposes a fluid flowing through the second heat exchanger 160 to the cool air flowing through the bypass duct 130, thereby further cooling the liquid coolant flowing through the thermal management system.

In the example of FIG. 2, a first coolant loop includes the combination of the first heat exchanger 150 and the second heat exchanger 160.

The liquid coolant exits the second heat exchanger 160 via a fluid line 164. The fluid line 164 connects the second heat exchanger 160 to a third heat exchanger 180. The third heat exchanger 180 is positioned on a leading edge of the BiFi 170, and simultaneously cools the liquid coolant passing through the heat exchanger 180 and provides a passageway for the liquid coolant to pass through the bypass duct 130 into the engine core 110. The liquid coolant exits the third heat exchanger 180 through a fluid line 182 that connects the third heat exchanger 180 with a fluid pump 184. The fluid pump 184 drives the fluid flow through the thermal management system, and is any known fluid pump suitable for utilization in a gas turbine engine. In alternative examples, the fluid pump 184 can be positioned at any other suitable point in the circuit and still drive the flow of fluid through the circuit. In some examples, the fluid pump 184 is driven directly or indirectly by rotation of a shaft in the engine core 110. In other examples, the fluid pump 184 can be an electrically driven pump.

The output of the fluid pump 184 is connected to multiple cooled engine systems 190. As the liquid coolant flows through the cooled engine systems 190, heat from the engine systems 190 is transferred to the liquid coolant thereby cooling the engine systems 190 and heating the liquid coolant. The heated liquid coolant is returned to the tank 140 through a fluid return line 192. In the illustrated example, the fluid return line 192 is passed through the bypass duct 130 through the BiFi 170. In alternative examples, the fluid return line 192 can be passed through the bypass duct 130 using any suitable alternative structure spanning the bypass duct 130. The flow returning to the tank in line 192 may also utilize passages in the BiFi leading edge that flow the opposite direction. In the example of FIG. 2, a second coolant loop includes the third heat exchanger 180, the fluid pump 184, the cooled engine systems 190 and the return line 192.

Due to practical considerations within the engine core 110, the liquid coolant provided to the cooled engine systems 190 is an oil based liquid coolant. Further, in the example of FIG. 2, the output of the first liquid coolant loop is connected to the input of the second liquid coolant loop to form a single unified liquid coolant loop, with a single oil based liquid coolant flowing through the unified liquid coolant loop.

Figure 3:
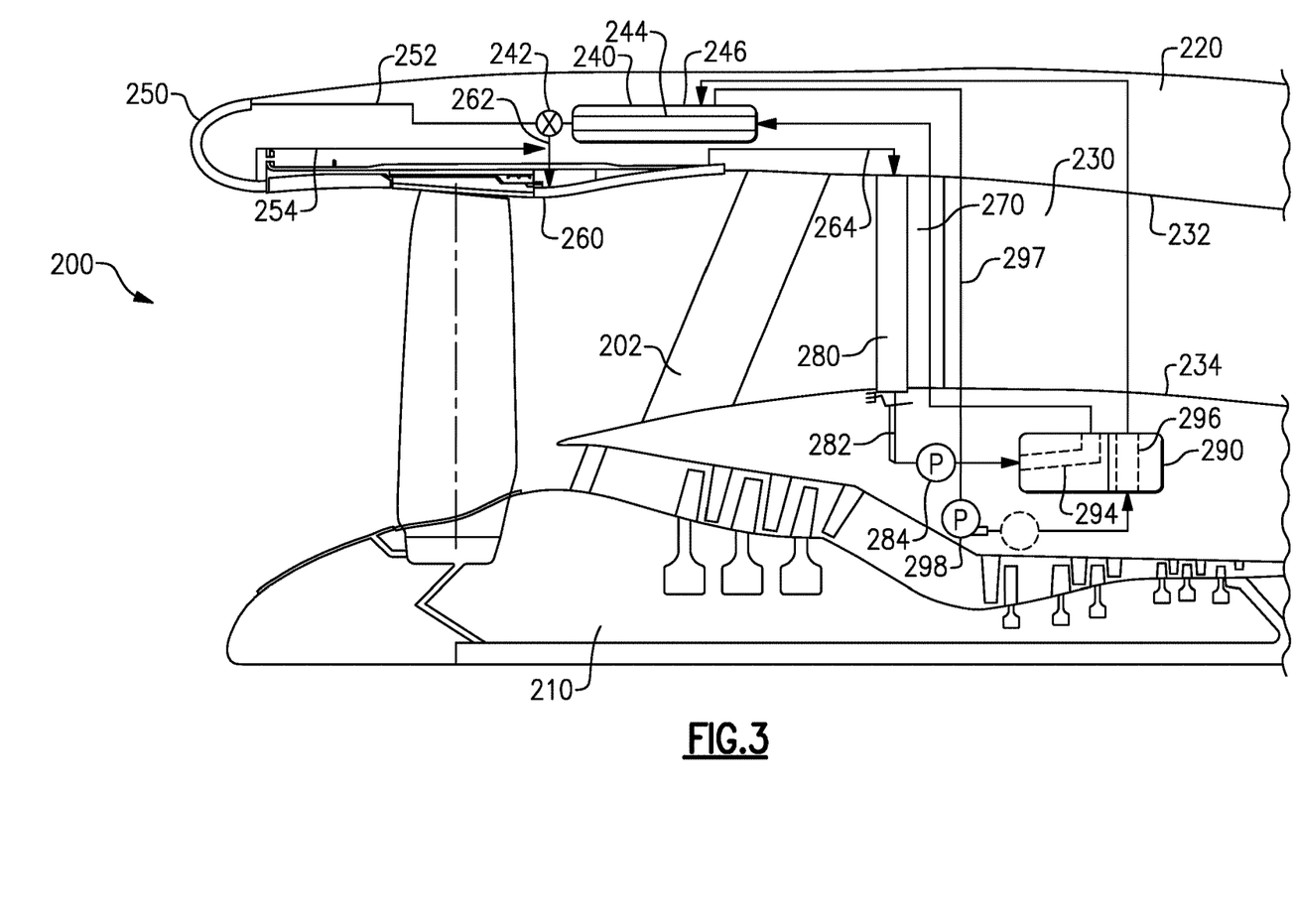
FIG. 3 schematically illustrates a second example thermal management system for a gas turbine engine.

In some instances it can be desirable to utilize a water anti-freeze mixture for some aspects of the thermal management, while still providing an oil based coolant to some of the engine components. FIG. 3 illustrates an example gas turbine engine 200 having a thermal management system that utilizes a water antifreeze mixture as the liquid coolant for part of the thermal management system. As with the example gas turbine engine 100, illustrated in FIG. 2, the gas turbine engine 200 includes an engine core 210 housing a compressor section, a combustor, a turbine section, as well as all the accompanying mechanical components. A nacelle 220 radially surrounds the engine core 210, and a bypass duct 230 is defined between the nacelle 220 and the engine core 210, with the bypass duct outer diameter 232 being an inner diameter of the nacelle 220 and a bypass duct inner diameter 234 being an outer diameter of the engine core 210. The nacelle 220 is supported relative to the engine core 210 via a support strut 202. The support strut 202 spans the bypass duct 230. In a practical example, multiple support struts 202 are disposed circumferentially about the bypass duct 230. Also disposed within the bypass duct 230, and spanning the bypass duct 230 is a BiFi 270.

The thermal management system included within the illustrated gas turbine engine 200 includes a tank 240 disposed in the nacelle 220. The tank 240 is an oil tank that accumulates and stores heated liquid coolant, such as oil. Also included within the tank 240 is a secondary heat exchanger 244. The secondary heat exchanger 244 provides a liquid coolant flowpath through the tank 240 and allows heat to be exchanged between the liquid coolant stored in the tank 240 and a liquid coolant in the secondary heat exchanger 244.

In the example of FIG. 3, a first liquid coolant loop in the thermal management system includes an output bypass valve 242 connected to an output of the secondary heat exchanger 244. One output of the output valve 242 is connected to a first heat exchanger 250 via a fluid line 252. As with the example of FIG. 2, the first heat exchanger 250 is positioned at a leading edge of the nacelle 220 and operates to both cool a hot liquid passing through the first heat exchanger 250, and heat the leading edge of the nacelle 220. The heating effect allows the first heat exchanger 250 to operate as a nacelle anti-icer, in addition to cooling the liquid coolant passing through the thermal management system.

The output of the first heat exchanger 250 is passed through a fluid line 254 and joined with the fluid line 262 connecting the valve 242 to the second heat exchanger 260. The second heat exchanger 260 is positioned on the bypass duct outer diameter 232, and is flush with a radially inward facing surface of the bypass duct 230. The second heat exchanger 260 exposes a hot fluid flowing through the second heat exchanger 260 to the cool air flowing through the bypass duct 230, thereby further cooling the liquid coolant flowing through the thermal management system.

In the example of FIG. 3, a second liquid coolant loop receives the output of the second heat exchanger 260 through a fluid line 264 at an input of a third heat exchanger 280. The third heat exchanger 280 is positioned along a leading edge of a BiFi 270, and simultaneously cools the liquid coolant passing through the third heat exchanger 280 and provides a passage through the bypass duct 230 into the engine core 210.

The liquid coolant exits the third heat exchanger 280 through a fluid line 282 that connects the third heat exchanger 280 to a first pump 284. The first pump 284 drives the fluid flow through the first and second liquid coolant loops in the thermal management system, and is any known fluid pump suitable for utilization in a gas turbine engine. The liquid coolant is then passed through a first portion 294 of the engine components 290 within the engine core 210. As the liquid coolant flowing through the first and second coolant loops in the example of FIG. 3 is a water anti-freeze mixture, the engine components in the first portion 294 of the engine components 290 are the engine components that do not require utilization of an oil based coolant.

In order to cool the remainder of the engine components 290, a second portion 296 of the engine components is included in a third liquid coolant loop. The third liquid coolant loop includes a pump 298 that is connected to an oil storage portion 246 of the tank 240 via a fluid line 297. The pump 298 drives an oil based liquid coolant through the second portion 296 of the engine components 290, thereby providing a cooling effect to the engine components 290. The heated oil is then returned to the oil storage portion 246 of the tank.

The heated oil is hot, relative to the temperature of the water anti-freeze mixture passing through the secondary heat exchanger 244. As a result, the secondary heat exchanger 244 cools the oil in the oil storage portion 246, allowing the oil based coolant to be adequately cooled. While the pump 298 driving the third liquid coolant loop is positioned within the engine core 210 in the illustrated example, one of skill in the art having the benefit of this disclosure will understand that the pump 298 could alternatively be located within the nacelle 220.

Figure 4:
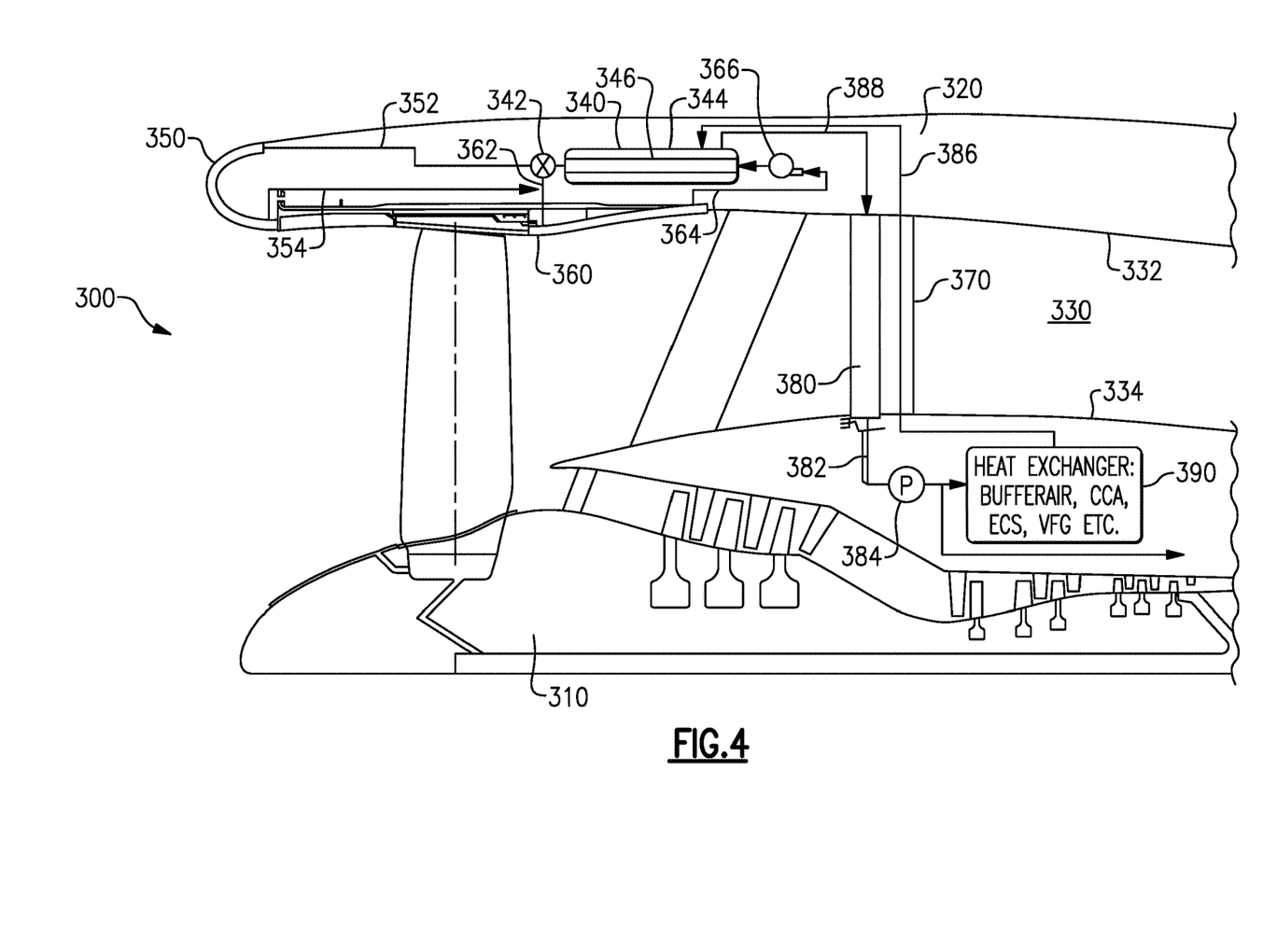
FIG. 4 schematically illustrates a third example thermal management system for a gas turbine engine.

A third example thermal management system for a gas turbine engine 300 is illustrated in FIG. 4. The third thermal management system utilizes a water antifreeze mixture to cool an oil based liquid coolant, with the cooled oil based liquid coolant being provided to, and cooling, the engine core 310.

As with the previous illustrated examples, the gas turbine engine 300 includes an engine core 310 surrounded by a nacelle 320. A bypass duct 330 is defined between the engine core 310 and the nacelle 320, with an outer diameter 332 of the bypass duct being defined by an inner diameter of the nacelle 320 and an inner diameter 334 of the bypass duct 330 being defined by an outer diameter of the engine core 310. Disposed within the nacelle 320 is a tank 340. The tank 340 includes an oil storage portion 346 and a secondary heat exchanger 344. The secondary heat exchanger 344 passes through the oil storage portion, and allows a relatively cool water anti-freeze mixture to cool the oil based coolant stored in the oil storage portion 346.

In the example of FIG. 4, a first liquid coolant loop is connected to an output of the secondary heat exchanger 344 via a bypass valve 342. The valve 342 provides a liquid coolant to a first heat exchanger 350 via a fluid line 352. The first heat exchanger 350 is positioned at the leading edge of the nacelle 320 and operates as a nacelle anti-icer, in addition to operating as a heat exchanger. The output of the first heat exchanger 350 is provided to a second heat exchanger 360 through a fluid line 354. Additional liquid coolant is provided to the second heat exchanger 360 from the valve 342 via a fluid line 362. The second heat exchanger 360 is disposed on the outer diameter 332 surface of the bypass duct 330 and further cools the liquid coolant.

Upon exiting the second heat exchanger 360 the liquid coolant in the first liquid coolant loop is provided to a first pump 366 via a fluid line 364. The first pump 366 drives the liquid coolant to circulate through the first coolant loop and the secondary heat exchanger 344. When the liquid coolant is returned to the secondary heat exchanger 344 the coolant is cool relative to the oil storage portion 346 of the tank 340.

In one example, the liquid coolant in the first liquid coolant loop is a water anti-freeze mixture. During operation, the cooled water anti-freeze mixture passing through the secondary heat exchanger 344 cools the oil in the oil storage portion 346 of the tank 340.

In the example of FIG. 4, a second liquid coolant loop connects the oil storage portion 346 of the tank 340 to a third heat exchanger 380 via a fluid line 388. The third heat exchanger 380 is positioned at a leading edge of an engine BiFi 370, and further cools the oil based coolant provided from the oil storage portion 346 of the tank 340. The third heat exchanger 380 provides the cooled oil based coolant to a pump 384 disposed in the engine core 310 via a fluid line 382. In alternative examples, the pump 384 may be disposed at any other suitable point in fluid circuit.

The pump 384 drives the oil based coolant through multiple engine components 390 in the engine core 310, and then back to the oil storage portion 346 of the tank 340 through a fluid return line 386. The hot returned oil based coolant is then recirculated and cooled through the tank 340 and the third heat exchanger 380.

While each of the example thermal management systems described above utilizes at least two liquid coolant loops, one of skill in the art, having the benefit of this disclosure, will understand that each of the liquid coolant loops can include further coolant loops, and additional heat exchangers or other additional components and still fall within the auspices of this disclosure. In one alternative example, a thermal management system can incorporate one or more additional heat exchangers at other positions on the outer diameter 132, 232, 332 of the bypass duct 130, 230, 330. In yet a further alternative example, a thermal management system can extend the second heat exchanger 160, 260, 360 axially further aft than is illustrated. Extending the second heat exchanger 160, 260, 360 axially further aft, or incorporating an additional heat exchanger provides additional cooling to the cooling fluid.

Further, while described and illustrated above as a tank 140, 240, 340 incorporated into the nacelle 120, 220, 320, the tank 140, 240, 340 can alternatively be any fluid storage device, and can be incorporated within the engine core 110, 210, 310 instead of the engine nacelle 120, 220, 320 with minimal modification to the illustrated features.

Further, while described above within the context of a geared turbofan engine, one of skill in the art having the benefit of this disclosure will understand that the illustrated and described thermal management systems can apply to any style turbofan engine including geared and direct drive engines.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine system for cooling engine components comprising:
an engine core, a core housing containing the engine core, and an engine core driven fan forward of the core housing;
a nacelle surrounding the engine core driven fan and the core housing;
a bypass duct defined between an outer diameter of the core housing and an inner diameter of the nacelle;
a thermal management system including:
a coolant circuit including a first heat exchanger disposed on the inner diameter of the nacelle and a second heat exchanger disposed on a leading edge of a bifurcation (BiFi) spanning said bypass duct, wherein the first heat exchanger is in thermal communication with the second heat exchanger, the coolant circuit further including an oil tank having an oil tank heat exchanger disposed within the oil tank, the oil tank heat exchanger being operable to exchange heat from a first coolant to a second coolant, and having a first coolant input, a first coolant output, a second coolant input and a second coolant output; wherein the first coolant is a first liquid that passes through the first heat exchanger and the second heat exchanger and subsequently enters the oil tank heat exchanger via the first coolant input, and the second coolant is a second liquid that passes into the oil tank via the second coolant input; and wherein the oil tank is disposed within the nacelle.

2. The gas turbine engine system for cooling engine components of claim 1, wherein a first coolant loop within said coolant circuit comprises said first heat exchanger, said second heat exchanger, and at least one cooled engine systems, and wherein a second coolant loop in said coolant circuit includes a nacelle anti-icer.

3. The gas turbine engine system for cooling engine components of claim 1, wherein a first coolant loop within said coolant circuit comprises said first heat exchanger, said second heat exchanger and a first subset of a plurality of cooled engine systems; wherein a second coolant loop within said coolant circuit comprises a second subset of said plurality of cooled engine systems; wherein said first coolant loop is fluidly connected to said first coolant input and said first coolant output of said oil tank heat exchanger; and wherein said second coolant loop is fluidly connected to said second coolant input and said second coolant output of said oil tank heat exchanger.

4. The gas turbine engine system for cooling engine components of claim 3, wherein the first coolant in said first cooling loop is a water anti-freeze mixture, and wherein the second coolant in said second cooling loop is an oil based coolant.

5. The gas turbine engine system for cooling engine components of claim 1, wherein the coolant circuit further includes a third heat exchanger disposed at a nacelle leading edge such that said third heat exchanger is operable to be a nacelle anti-icer.

6. The gas turbine engine system for cooling engine components of claim 5, wherein the coolant circuit further includes a bypass valve fluidly connecting the third heat exchanger to the first heat exchanger such that fluid flowing through said cooling circuit can selectively bypass said third heat exchanger.

7. The gas turbine engine system for cooling engine components of claim 1, wherein said coolant circuit includes at least one pump operable to drive cooling fluid flow through said coolant circuit.

8. A method for cooling a gas turbine engine comprising:
passing a first liquid coolant through a first liquid cooling loop including a first heat exchanger and a second heat exchanger, thereby at least partially cooling the first liquid coolant, wherein the first heat exchanger and the second heat exchanger are disposed within an engine nacelle;

passing a second liquid coolant through a second liquid cooling loop including a third heat exchanger and at least one engine component, thereby at least partially cooling the second liquid coolant and cooling the at least one engine component, wherein the third heat exchanger spans a bypass duct and the at least one engine component is disposed within a gas turbine engine core; and providing an output of the first liquid cooling loop to an oil storage tank heat exchanger disposed within an oil storage tank, and wherein the oil storage tank heat exchanger cools the second liquid coolant relative to the first liquid coolant, and wherein the oil storage tank is disposed within the engine nacelle.

9. The method of claim 8, wherein the first liquid cooling loop comprises said first heat exchanger, and said second heat exchanger, wherein said first heat exchanger is disposed at a nacelle leading edge, such that said first heat exchanger is operable to be a nacelle anti-icer; wherein the second liquid cooling loop includes said third heat exchanger and the at least one engine component; wherein said first liquid cooling loop is fluidly connected to a first coolant input and a first coolant output of said oil tank heat exchanger; and wherein said second liquid cooling loop is fluidly connected to a second coolant input and a second coolant output of said oil tank heat exchanger.

10. The method of claim 8, wherein passing the first liquid coolant through the first liquid cooling loop including the first heat exchanger and the second heat exchanger further comprises operating the first heat exchanger as a nacelle anti-icer.

11. The method of claim 8, wherein passing the first liquid coolant through the first liquid cooling loop comprise passing a water anti-freeze mixture through said first liquid cooling loop.

12. The method of claim 8, wherein passing the second liquid coolant through the second liquid cooling loop comprises passing an oil based liquid coolant through said second liquid cooling loop.

* * * * *